April 19, 1966     E. A. BOWERS     3,246,848
IRRIGATION SYSTEM AND APPARATUS THEREFOR
Filed May 11, 1964     3 Sheets-Sheet 1
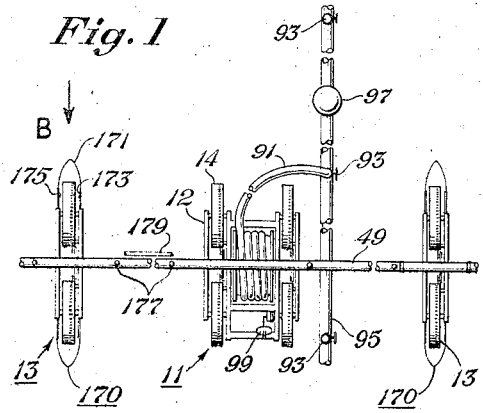
Fig. 1
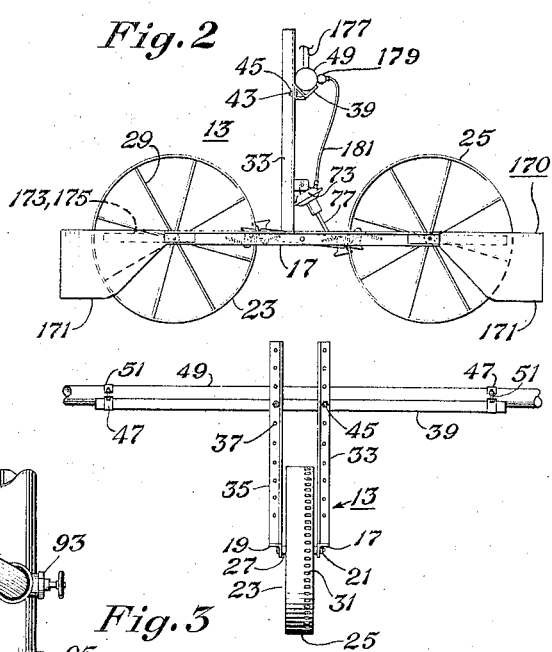
Fig. 2
Fig. 3
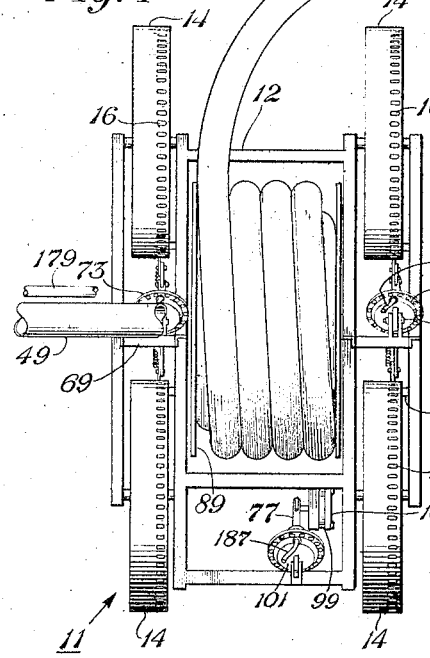
Fig. 4
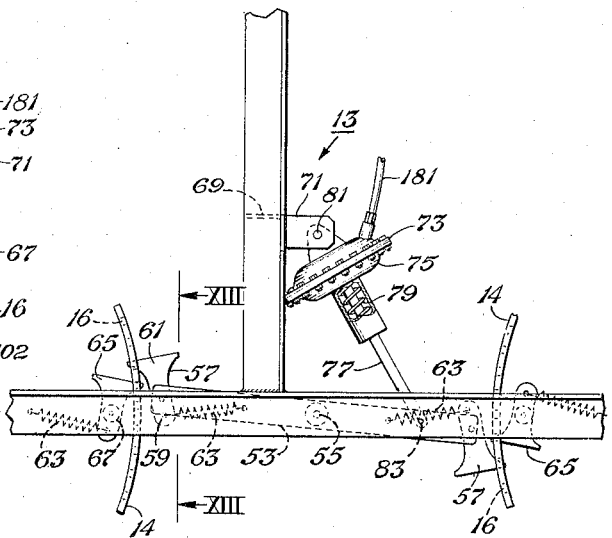
Fig. 12
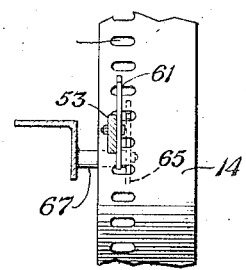
Fig. 13
INVENTOR.
Earl A. Bowers
BY
Wm. T. Wofford
Attorney April 19, 1966   E. A. BOWERS   3,246,848
IRRIGATION SYSTEM AND APPARATUS THEREFOR
Filed May 11, 1964   3 Sheets-Sheet 2

INVENTOR.
Earl A. Bowers
BY Wm. T. Wofford
Attorney

April 19, 1966  E. A. BOWERS  3,246,848
IRRIGATION SYSTEM AND APPARATUS THEREFOR
Filed May 11, 1964  3 Sheets-Sheet 3

INVENTOR.
Earl A. Bowers
BY Wm. T. Wofford
Attorney

United States Patent Office 3,246,848
Patented Apr. 19, 1966

3,246,848
IRRIGATION SYSTEM AND APPARATUS
THEREFOR
Earl A. Bowers, Star Route, Goodland, Tex.
Filed May 11, 1964, Ser. No. 366,481
2 Claims. (Cl. 239—212)

My invention relates to irrigation systems and apparatus therefor and more particularly to improved mobile-self-propelled irrigation apparatus for use in an improved over-the-ground irrigation system.

Numerous efforts have been made in the prior art to produce a satisfactory mobile, over-the-ground type of irrigation apparatus and system—one that is adaptable to irrigate large expanses of land, such as are found on farms.

The general object of the present invention is to provide an improved and simple mobile irrigation system using improved apparatus of the self-propelled type.

Another object of the present invention is to provide an inexpensive, yet efficient, mobile, self-propelled irrigation apparatus.

Another object of the invention is to provide an improved positive-drive propulsive mechanism for a self-propelled mobile irrigation apparatus.

Another object of the invention is to provide an improved and simple control valve mechanism for a self-propelled mobile irrigation apparatus.

Another object of the invention is to provide an improved control valve unit for use with a plurality of self-propelled irrigation units.

Another object of the invention is to provide a simple and effective propulsive and control system for a plurality of self-propelled irrigation units which system will provide synchronized positive movement of such units.

One of the principal features of the invention which provides means for carrying out these objects is the use of a master valve arrangement for controlling hydraulic motors on pipe carrier vehicles so that all the motors operate in synchronism. More specifically, a master diaphragm valve arrangement is employed to control and synchronize a plurality of hydraulic diaphragm motors, and by regulating the flow of fluid to the master diaphragm valve arrangement, the amount of water delivered to the ground to be irrigated per linear foot of travel of the system over the ground can be accurately regulated.

The above-mentioned and other objects are effected by my invention as will be apparent from the following description taken in connection with the accompanying drawings, forming a part of this application, in which:

FIG. 1 is a schematic plan view of a portion of an irrigation system in accordance with a preferred embodiment of the present invention;

FIG. 2 is a schematic side elevational view of one of the driven irrigation apparatus or vehicles of the present invention;

FIG. 3 is a schematic end elevational view of the vehicle of FIG. 2;

FIG. 4 is a schematic plan view of the power unit irrigation apparatus or vehicle of the present invention;

FIG. 12 is a schematic elevational view of the apparatus drive mechanism portion of the present invention; and FIG. 13 is a view taken along lines XIII—XIII of FIG. 12.

Figure 5:
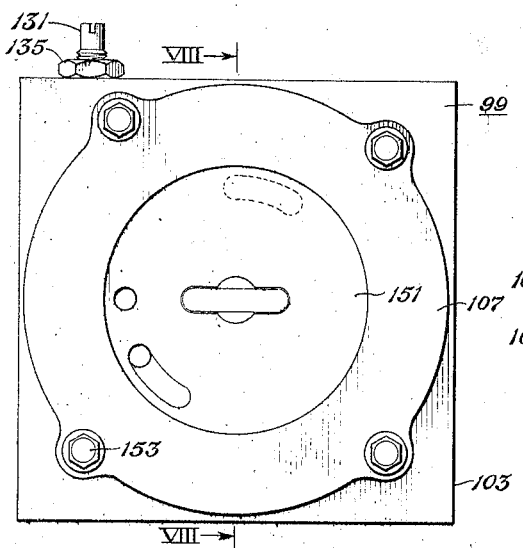
FIG. 5 is a schematic front elevational view of the control valve unit of the present invention.

In the drawings, FIG. 1 illustrates a portion of an irrigation system arranged in accordance with a preferred embodiment of the present invention. Essentially, the system comprises three elements; namely, a power-unit 11, a plurality of driven-units 13, and a fluid control arrangement 15 connected to both the power-unit 11 and the driven-units 13. All of the three elements of the system are arranged to travel down a field to be irrigated in unison. The power-unit 11 and the driven-units 13 are each separately driven by hydraulic motors. All of the motors respond to the control arrangement, which acts automatically to drive all of the units in synchronism.

FIGS. 2 and 3 illustrate one of the driven-units 13. Each of these units includes a pair of spaced apart, parallel, horizontal angle members 17, 19 which are journally mounted adjacent each end thereof to an axle 21 supporting a wheel 23.

Preferably, the wheels 23 have a flat rim 25 which is connected to a hub 27 by a plurality of spokes 29. The circular rim 25 is perforated around its girth by a plurality of uniformly spaced apart oval shaped holes 31 that are located preferably near one edge of the rim as shown in FIG. 3. Near the mid-length portion of the angle members 17, 19 there is fixed thereto, as by welding or in any other suitable manner, a pair of upright, parallel angle members 33, 35. In each of the transversely extending legs of the angles 33, 35, as may be noticed by referring to FIG. 3, there is a plurality of uniformly spaced apart holes 37; the holes in the leg of each respective upright angle 33, 35 being at substantially the same level as the holes in the other leg. There is removably attached to the upright angle members 33, 35 a fluid conduit supporting structure 39 comprising generally an angle shaped member to which is fixed a pair of angle shaped clips 43. Each such clip has a hole in the vertical leg thereof so that the conduit supporting structure 39 may be adjustably fastened to the upright angle members 33, 35 by means of bolts and nuts 45 located in the holes 37. Adjacent each end of the fluid conduit supporting structure 39, there is adjustably fixed thereto a split-type of strap 47, which is formed to fit over and engage a fluid conduit 49 lying in and supported thereby, shown in FIGS. 2 and 3. The fluid conduit 49 may be a rather heavy metal pipe which serves, structurally, to connect the driven-units 13 to the power-unit 11. It is held in a fixed longitudinal position by means of suitable bolts and nuts 51 through the strap 47.

It will be apparent from FIG. 1, that the driven-units 13 travel along at the same speed as the power-unit 11. The wheels 23 of the driven-units 13 are power actuated in synchronism with the wheels of the power-unit 11. The power-drive for the wheels 23 is identical with the power-drive for the power-unit 11, which will now be described in detail.

In FIGS. 4, 12 and 13, there is shown at an enlarged scale, the power-unit 11 of FIG. 1. This comprises generally, a vehicle consisting of a frame 12 having four wheels 14 and means for driving the wheels. There is a walking beam 53 mounted in the frame 12, which is pivotally mounted on a stub shaft 55 extending inwardly from the vertical legs of the frame 17. The walking beam has power dogs 57, pivotally mounted adjacent the ends thereof. Each power dog 57 has a straight shank portion 59 which merges arcuately into a larger head portion 61 that is cut off generally square to the longitudinal axis of the shank portion 59. The power dogs 57 are resiliently biased into engagement with the oval shaped holes 16 in the rim of the wheels 14 by means of a tension type spring 63 which is connected to the power dog 57 adjacent the end of the shank portion 59 and to the walking beam 53, as shown in dotted lines in FIG. 12. A similarly shaped latch dog 65, is pivotally mounted on another stub shaft 67 (see FIG. 13) which is fixed to and projects perpendicularly from the frame 12. The latch dog 65 is resiliently biased by a spring 67 against the rim of the wheels 14, and also engages the next adjacent one of the oval shaped holes 16 in the rim. It will be noticed by referring to FIG. 12, that the respective power and latch dogs 57, 65 are located at opposite ends of the walking beam 53 and that they are pointed in opposite directions, for a reason that will become apparent hereinafter.

Between the upright angle members of the frame 12, there is fixed, at a convenient height, an angle member 69 to which is fixed a pair of ears 71 that project outwardly from the angle member 69, as shown in FIG. 12. A hydraulic diaphragm motor 73 which may be of any conventional type and appropriate size, is pivotally mounted on a shaft 81 on the ears 71. The motor 73 includes a casing 75, a rod 77, a spring 79, and a resilient diaphragm within the casing. The free end of the rod 77 is pivotally connected, as at 83, to the walking beam 53 at a convenient location adjacent the right hand end thereof, as viewed in FIG. 12.

The fluid system, which includes the control arrangement, is shown in part in FIG. 1, and part of it is shown, enlarged, in FIG. 4. The fluid control arrangement is shown diagrammatically in FIGS. 10 and 11. There is provided a conventional type hose reel 89, on which there is carried a convenient length of flexible hose 91. The reel 89 is suitably journaled on the frame 12, as shown in FIG. 4. One end of the hose 91 is connected to any one of a plurality of hydrant valves 93 connected in a main line water conduit 95. The other end of the hose 91 is connected to the fluid conduits 49 in an appropriate manner, as through a swivel hose coupling in the shaft which supports the reel.

It will be observed by referring to FIG. 1, that the main water line 95 is connected to a conventional type of water-well pump 97, which may be located in a convenient central place in the field or area of ground to be irrigated, and which is connected both to a power source and to a source of irrigation water.

On the frame 12 of the power-unit 11, there is mounted a control device. This includes a control valve 99 and a control valve actuating hydraulic diaphragm motor 101. The control valve 99 is suitably mounted on the extension place bracket 102 fixed to the frame 12. The control valve 99 is so located that the diaphragm motor 101, which is similar to the hydraulic diaphragm motors 73, will actuate the control valve 99 to send pressure pulses to the motors 73 for the purpose to be described hereinafter.

The control valve 99 is shown in more detail in FIGS. 5 through 9 inclusive and comprises a main body portion 103, a spacer portion 105, a clamp-type cover 107, and an internal valve disc 109.

Figure 6:
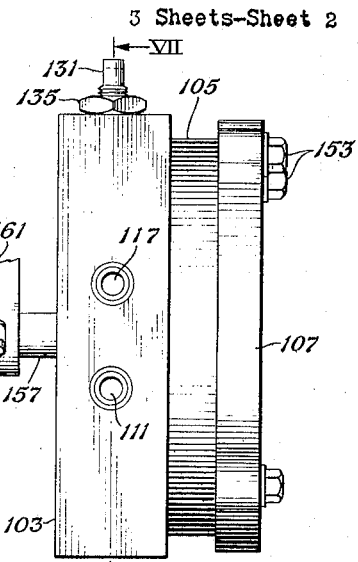
FIG. 6 is a schematic side elevational view of the control valve unit of FIG. 5.
Figure 7:
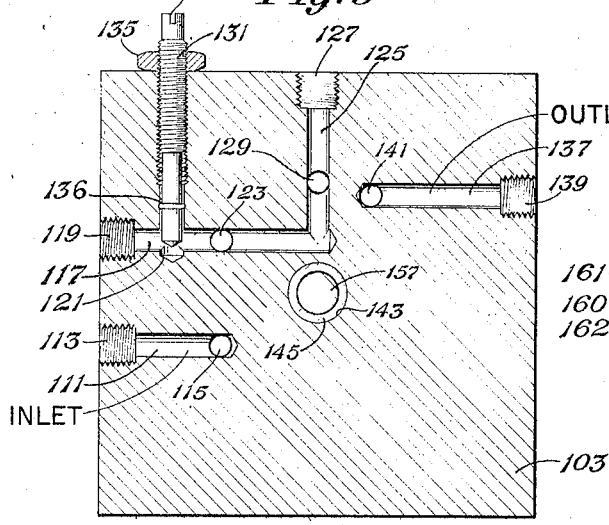
FIG. 7 is a sectional view taken along line VII—VII of FIG. 6.

The main body portion 103 is made from a relatively thick, square piece of aluminum preferably, although other suitable metals or plastics and the like may be used. In the main body portion 103 there is a plurality of fluid passages. A main fluid inlet passage 111, which has a threaded end portion 113 merges at the inner end region with a second passage 115. The passage 115 is disposed at substantially right angles to the main fluid inlet passage 111 and conveys fluid from the passage 111 through the front exterior side of the main body portion 103. A third fluid passage 117 is disposed above, and in substantially the same vertical plane as the main fluid inlet passage 111. It will be noticed by referring to FIG. 7, that the third fluid passage 117 also has a threaded end portion 119 and that it extends within a short distance from the main fluid inlet passage 111, as shown in FIG. 6. It will be noticed, also, that the passage 117 merges with first, second and third fluid passages 121, 123, 125 respectively. The first and third merging fluid passages 121, 125 lies substantially in the vertical plane of the passages 111 and 117, while the second merging fluid passage 123 is substantially parallel to the passage 115. The second merging fluid passage 123 is located substantially vertically above the passage 111 and is substantially co-planar therewith. The passage 123 also emerges from the same front exterior surface of the main body portion 103 as does the passage 115. The third merging fluid passage 125, which has a threaded end portion at 127, also merges with another fluid passage 129, which is substantially parallel to and co-extensive with the passages 115 and 123. The first merging fluid passage 121 is purposely threaded for a substantial portion of its length and there is disposd therein an adjustable screw-type needle valve 131 (FIG. 7) which extends above the top edge of the main body portion 103. The upper end of the needle valve 131 is slotted, as at 133, to receive any suitable valve adjusting tool. A lock nut 135 is threaded on the upper portion of the valve stem, and it may be tightened against the main body portion 103 to hold and maintain the needle valve 131 in any selected position. An O-ring type of fluid seal 136 is also fitted on the needle valve to provide a fluid seal with the wall of the passage 121. The lower end of the needle valve 131 is formed to closely mate with a socket portion of the passage 121, so as to close the passage 117 whenever desired.

A fluid outlet passage 137 (FIG. 7), which also has a threaded portion 139 at the exterior end, enters the main body portion 103 from the side opposite the passages 111 and 117 with which it is substantially co-planar. The inner end of the passage 137 merges with another fluid passage 141 which is likewise parallel to and co-extensive with each of the passages 115, 123 and 129. In the central region of the main body portion 103 there is a hole 143 which extends through the main body portion and in which there is fitted a sleeve type bearing 145. The four parallel passages 115, 123, 129 and 141, it should be noted, are disposed at substantially the same radial distance from the center of the hole and bearing repairing 143, 145.

Figure 8:
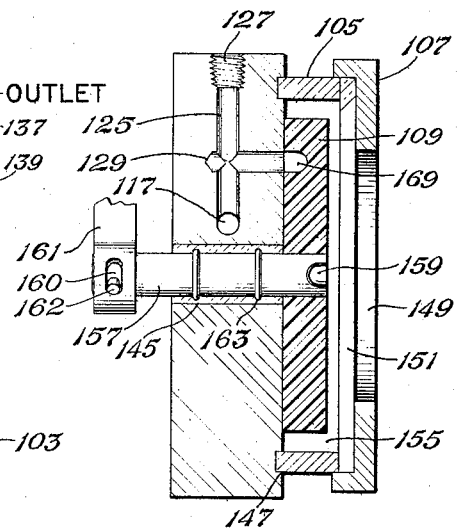
FIG. 8 is a sectional view taken along line VIII—VIII of FIG. 5.
Figure 9:
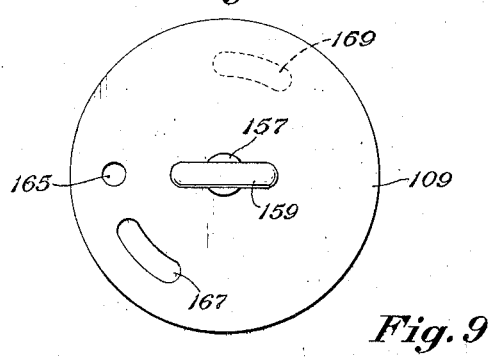
FIG. 9 is a schematic front elevational view of the internal valve disc of the control valve unit.

The front exterior surface of the main body portion 103 is grooved at 147 to receive one end of the cylindrical spacer piece 105, as may be notified by referring to FIG. 8. The spacer piece 105 may be made of any appropriate material such as aluminum, steel, plastics or the like.

The clamp-type cover 107 is generally circular in shape and is provided with a central opening 149. The inner surface of the cover 107 is recessed to receive and fit over the periphery of a translucent window-like member 151 that fits over and seals against the end of the spacer piece 105. A plurality of bolts 153 pass through holes in the cover 107 and are threaded into other holes in the main body portion 103, so that the cover, window and spacer piece may be secured in place.

In the cavity 155, bounded by the main body portion, spacer and cover, there is disposed the valve disc 109 which is fixed to one end of a drive shaft 157 by means of a key 159. The shaft 157 is journaled in the bearing 145 and extends beyond the main body portion 103, a sufficient distance to receive a valve disc actuating lever 161. The lever 161 has an elongate slot 160 in the rounded portion in which a pin 162 is free to move; the pin 162 being fixed to the shaft 157. The lever 161 is biased in one position or another by a spring 189, shown in FIGS. 10 and 11.

As shown in FIG. 8, a pair of O-ring type seals 163 are fitted on the shaft 159. In the valve disc 109 there is a single circular hole 165 (FIG. 9) located at substantially the same radial distance from the center of the shaft 157 (and thus from the hole 143) as the passages 115 and 123 in the main body portion 103. Another hole 167, which is arcuate, is located in the valve disc 109 at substantially the same radial distance from the shaft center as the hole 165. The arcuate hole 167 is angularly displaced from the hole 165 a distance such that, when the valve disc is rotated so as to place the hole 165 in alignment with the passage 123, the far end of the arcuate hole 167 is aligned with the passage 115. The surface of the valve disc, which is slideable on the front exterior surface of the main body portion 103, also has in it an arcuate groove 169—not a hole, but merely a groove—which is at substantially the same radial distance from the center of the shaft 157 as is the arcuate hole 167. The location and length of the arcuate groove 169 is such that, when the valve disc is rotated to the proper location, the arcuate groove 169 communicates with both of the passages 129 and 141.

At various locations along the conduit 49 there is located a plurality of vertically disposed conduits 177, and, on the upper end of each, there may be connected any preferred type of water distribution device to irrigate an area of ground.

Since the pipe 49 contains water under pressure, this pressure may be used to operate the fluid control arrangement. To this end, the valve 99 is connected to the conduit 49 by the conduit 185.

Adjacent the conduit 49, there is disposed a smaller pressure conveying conduit 179 which is connected to the control valve 99 at the threaded end 127 and also to each of the hydraulic diaphragm motors 73 individually by means of a length of flexible-hose 181. It will be understood that the conduit 179 does not convey water for irrigation to any great extent. Pressure pulses are conveyed to the motors 73 by it.

The control valve 99 not only causes pulses to actuate the motors 73, but also to the motor 101. For this purpose, a flexible-hose 187 (shown schematically in FIGS. 10 and 11), is connected to the control valve device 99 at the threaded end 119, and to the hydraulic diaphragm motor 101.

Figure 10:
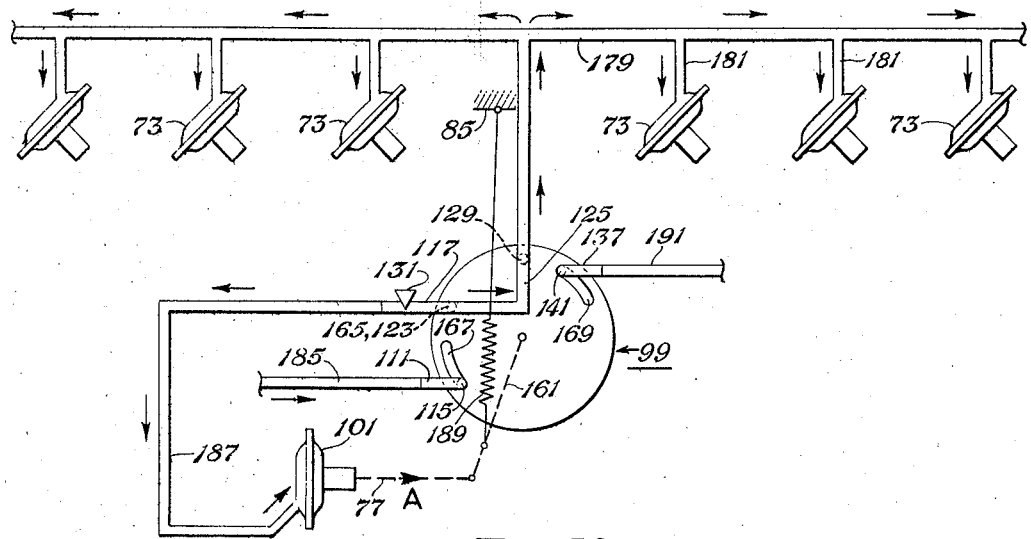
FIG. 10 is a diagrammatic arrangement of the fluid control system at the commencement of the power stroke.

The operation of the system may be as follows:

At the commencement of a power stroke, the walking beam 53, the power dogs 57, and the latch dogs 65 are disposed in about the position shown in FIG. 12. The relative position of the parts of the control valve 99, at the commencement of the power stroke, is shown in FIG. 10. With the valve disc 109 in the position shown schematically in FIG. 10, water may enter the passage 111 via the hose 185 and flow through both the passage 115 and the arcuate hole 167, and fill the cavity 155. Thence it flows through the hole 165 and the passage 123 into the passage 117. It will be noticed that the water in the passage 117 may flow in two directions, but that the fluid flow in only one direction is controlled and regulated by the needle valve 131.

The needle valve controls the action of motor 101. The needle valve may be adjusted to control the time cycle of this motor. Fluid which flows past the needle valve 131 enters the motor 101 via the hose 187 and exerts pressure on its internal diaphragm. This pressure causes the rod 77 to move toward the right (as indicated by the arrow A in FIG. 10).

While this is taking place, water flows in the passage 125 and in the fluid conduit 179 and flexible hoses 181 to the several motors 73. These diaphragms of these motors also act as does the diaphragm motor 101 and the pressure of water in each motor 73 urges its rod 77 in a downward direction (as viewed in FIG. 12). When the walking beam 53 moves pivotally about the stub shaft 55, the power dogs 57 exert a force and urge their respective wheel 23 to rotate counter clock-wise as viewed in FIGS. 2 and 12. The entire fluid conduit 49 is then carried over the ground in the direction of the arrow B in FIG. 1, and the movement of the power-unit 11, as well as the driven-units 13 is positively synchronized at the master control valve 99.

Figure 11:
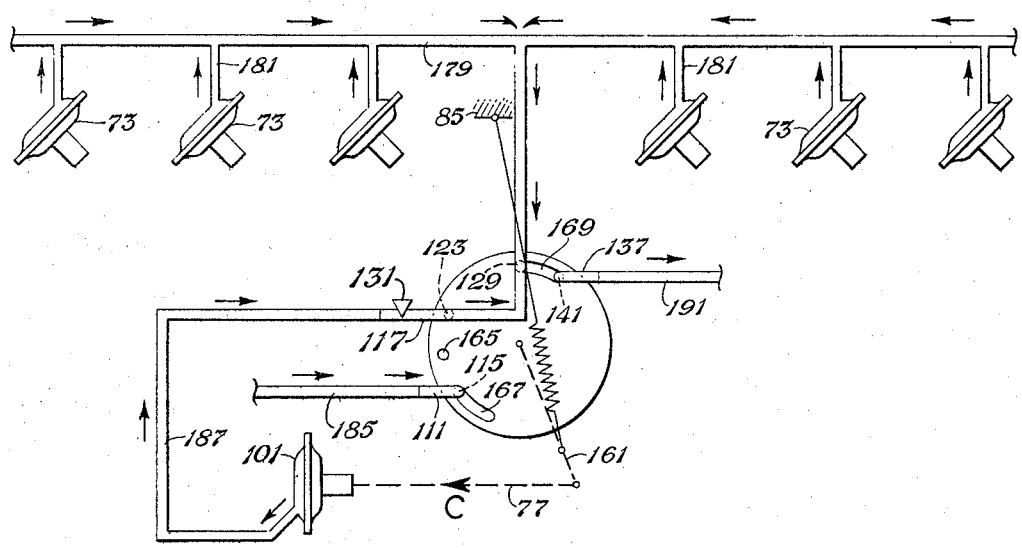
FIG. 11 is a diagrammatic arrangement of the fluid control system at the commencement of the exhaust stroke.

Now, as the diaphragm of the motor 101 expands, the actuating lever 161, will in due time, reach a position when the over-center spring 189 will snap the lever 161 to the position shown in FIG. 11. At the time this over-center action takes place, one extremity of the slot 160 engages the pin 162 whereupon the shaft 157 and the internal valve disc 109 are caused to move to the exhaust position, shown schematically in FIG. 11. In this exhaust position, the water which was flowing via the passages 111, 115 and hole 165 into the cavity 155, can no longer flow via the hole 165, as it has been moved from a position of registration shown in FIG. 10, to an out of registration position shown in FIG. 11. However, at the same time, the arcuate groove 169 has been brought into a communicating position with the passages 129 and 141. Consequently, the fluid in each diaphragm motor 73 is now expelled therefrom by its spring 79; the fluid returning from the motors 73 flowing, as indicated generally by the arrows in FIG. 11, via the arcuate groove 169 and the outlet passage 137 to the exterior of the control valve unit 99.

If preferred, a flexible-hose type conduit 191 (shown schematically in FIGS. 10 and 11) may be threadedly connected to the end 139 of the outlet passage 137, and the exhaust fluid may be conveyed to a desired location.

Meanwhile, the pressure is also bleeding off, slowly, through needle valve 131, from the diaphragm of motor 101, so that the rod 77 of the motor 101, under the influence of its spring 79, is moving in the direction of the arrow C (FIG. 11) and the actuating lever 161 moves with it. In due time, an over-center position is reached, whereupon the spring 189 snaps the lever 161 to the initial power stroke position, shown in FIG. 10. At that time, the other extremity of the slot 160 engages the pin 162 on the shaft 157 and the internal valve disc 109 is caused to pivot to the initial power stroke position, shown schematically in FIG. 10.

During the time when the water is being expelled from the motors 73, the walking beam 53 is also returning to its initial position. The power dogs 57 will move and engage another hole 31, thus being automatically positioned to resume movement of the wheels in the manner already described. The latch dogs 65 remain engaged, and prevent any backward rotational movement of the wheels during the exhaust stroke period of time.

When the fluid conduit 49 has been moved over the ground a distance substantially equal to the length of the flexible hose 91, the apparatus may be stopped by controlling the flow of water. The hose 91 may then be disconnected from the hydrant valve 93 and, after reeling it on the hose reel 89 by hand, or by a suitable power device, it may be reconnected to the next nearest hydrant valve 93. The flow of irrigation water may be started and the progress of the apparatus may then be continued.

When the apparatus reaches the end of the field or other area that is being irrigated, it may be readily and easily reversed by simply flipping the resiliently biased power dogs 57 clockwise through an arc of about 210 degrees, or to an opposite position, where they will engage the oval shaped holes 31. Likewise, the latch dogs 65 may be readily and easily reversed in the same manner. It is to be noted that the operation of the control valve, however, remains unchanged. The reverse movement of the apparatus is thus easily achieved by simply reversing the power and latch dogs.

When soil or ground conditions warrant, it may be desirable to attach several removable or fixed type cleats to the rims of the wheels to obtain better traction. Such cleats may, of course, be affixed in any suitable manner.

In some applications it may be desirable to provide a stalk separator device 170 at each end of the driven-unit 13 and also at the ends of the power-unit 11 if desired. Each stalk separator 170 includes a vertically disposed bent plate member 171 which is firmly connected to a pair of arms 173, 175 that extend outward from and are bolted, or otherwise suitably connected, to the horizontal angle members 17, 19, as shown in FIGS. 1 and 2.

While I have shown my invention in only one form, it will be obvious to those skilled in the art that it is not so limited, but is susceptible of various changes and modifications without departing from the spirit thereof.

I claim:
1. A mobile, over-the-ground irrigation system comprising, in combination,
 (a) a power-unit having wheels;
 (b) a plurality of driven-units laterally spaced from said power-unit and each including a frame having wheels;
 (c) a water conduit connecting the power-unit and the driven-units together, both structurally and hydraulically;
 (d) irrigation distributing means connected to said conduit for delivering water to the ground;
 (e) water pressure responsive diaphragm motors carried by each of said driven-units and said power-unit, expansible and contractible responsively to pressure pulses of water supplied thereto;
 (f) mechanical means for connecting said motors to said wheels to turn the same in response to movement of the motors; and
 (g) means operatively connecting said motors to said water conduit and including a fluid control arrangement mounted on said power-unit for causing pressure pulses of water to be supplied to said motors.

2. The combination defined in claim 1 in which all of the wheels on the power-unit and on the driven-units have rims with holes therein and in which the mechanical means for connecting said motors to said wheels on both the power-unit and the driven-unit includes walking beams with dogs for engaging the holes in the rims.

References Cited by the Examiner

UNITED STATES PATENTS

| | | | |
|---|---|---|---|
| 735,685 | 8/1903 | Whittington | 74—142 |
| 1,176,856 | 3/1916 | Salmond | 239—191 |
| 2,563,584 | 8/1951 | Crookston | 74—142 |
| 2,893,643 | 7/1959 | Gordon | 239—177 |
| 2,904,011 | 9/1959 | Miley | 91—433 |
| 2,931,579 | 4/1960 | Ruddell | 239—212 |
| 2,940,672 | 6/1960 | Gaskell | 239—212 |
| 3,166,089 | 1/1965 | Wagner | 137—344 |

M. HENSON WOOD, JR., *Primary Examiner.*

EVERETT W. KIRBY, *Examiner.*